United States Patent Office 3,424,518
Patented Jan. 28, 1969

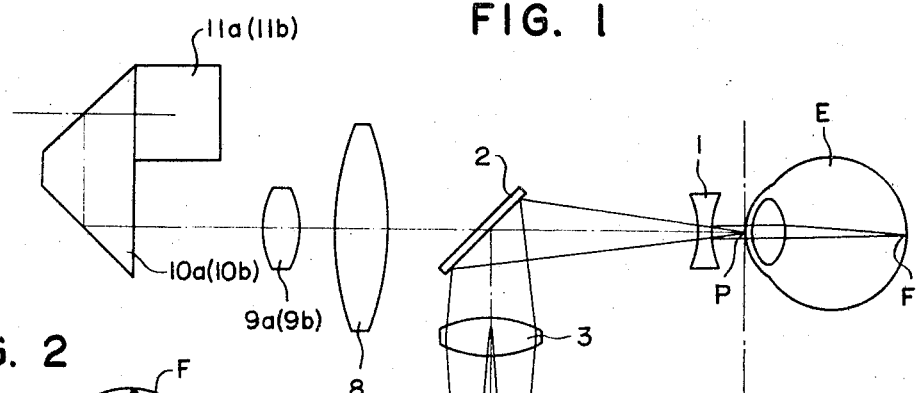
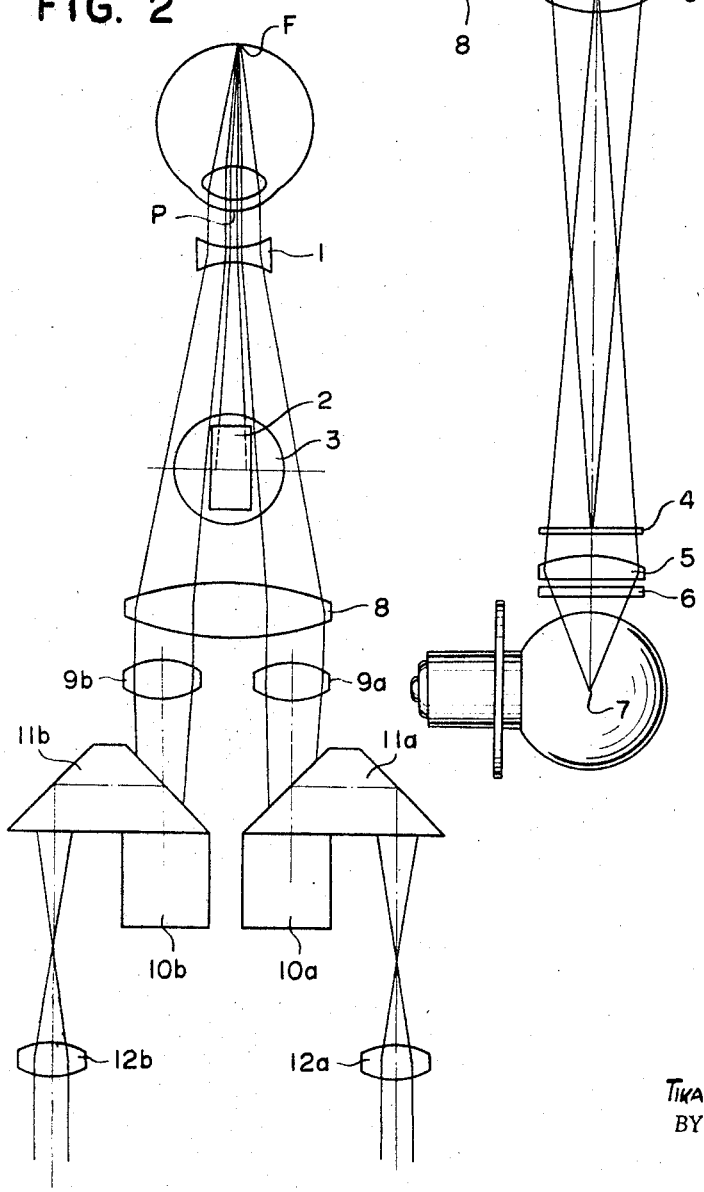

3,424,518
DEVICE FOR PROJECTING AND OBSERVING IMAGES OF EXTERNAL OBJECTS UPON THE RETINA OF THE EYE
Tikasi Sato, Tai Sato, Tutomu Sato, and Kenzo Sato, Yokohama-shi, Japan, assignors to Nippon Kogaku, K.K., Tokyo, Japan, a corporation of Japan
Filed Oct. 29, 1964, Ser. No. 407,489
Claims priority, application Japan, Dec. 21, 1963, 38/68,847
U.S. Cl. 351—6     2 Claims
Int. Cl. A61b 3/10

ABSTRACT OF THE DISCLOSURE

This invention relates to a device for objectively observing the overlapped image of an external object and a retinal image, wherein an afocal optical system cooperating with a divergent lens placed just in front of the eyeball broadens the diameter of the parallel bundles of light rays which pass into the pupil of the eye, a reflecting mirror of a projection system being placed at a certain point in the broadened light path and a pattern preparation projected upon the retinal area of the eyeball, an observing optical system receiving side bundles of light rays being provided to observe the images.

---

The instant invention relates to devices designed such that the observer may observe images of external objects projected upon the retina of the eye of the subject to be examined along with the physiological condition of the fundus.

Human eyes are comparable to photographic cameras in that people see external objects by forming images thereof on the retina. However, with the human eyes, since there is no focussing glass nor rangefinder as in the case in photographic cameras, it is impossible objectively to observe the result of image formation which is completed on the retina, the latter corresponding to the film surface in photographic cameras, without the aid of a suitable means.

The matter of objective observation is more complicated with the human eyeball than with the photographic camera. Since the former involves many other factors, such as, fovea centralis, ocular gyration, psychology and encephalology, the objective observation, if enabled, of retinal images in the eyeball, may contribute much to the development of techniques not merely for ophthalmic treatment but also for psychological research. The present invention provides a device which enables the attainment of such objects.

In the central part of the fundus of the human eye there is found an area of especial visual acuity called the "fovea centralis" considered to be dense in optic nerve distribution. When we see external objects and shift the points of fixation, the visual axis, i.e., the line connecting the fovea centralis and the pupil, is displaced in alignment with the successive points of fixation. The fovea centralis may be recognized as such in the form of small bright point on the retina, as the result of the reflection of light incident thereupon, when we search for it by applying thereto a telescopic ophthalmoscope magnifier from outside through the pupil.

It has been a usual practice to project a simple small point, a line section or a circle of the object fixedly on the retina in making observations to ascertain amblyopia and the like, and such technique is evidently insufficient in attaining the aforementioned objects. There are many ways of measuring ocular gyration and among such techniques in practice are those wherein the reflected image of the eyeball, or the potential of the eye, is measured but they, although resulting in a good record and measurement of ocular gyration itself, cannot indicate the current points of fixation or the course of the gyration of the eye in search of a certain object in the external world.

The instant invention provides a device which enables the determination of the hithertobefore impossible peripheral visual acuity by projecting images of an external object, for example, visual test charts, and the like, or images of criminal evidences or suspected criminals necessary for surveying facial features onto the retina of such subjects in order to develop techniques such as could be applied in the ophthalmic or psychological fields; or objectively to determine the intensity of concernment, for example with any newly designed patterns, of many people classified by sex, profession, and the like, by projecting images of such patterns on their retinas and following the displacement of the points of fixation, or said bright points, on the fovea centralies. The observer sees exactly what the person under examination watches. Further, the observer can exactly identify what the person is seeing by watching the movement of the fovea centralis. The observer can determine the relationship between the vision and the size of the image upon the retina, as also the peripheral vision. Thus the device may be effectively utilized not only in the field of physiology and pathology of eye, but also in psychology, sports, human technology, arts, criminology, etc.

The device in accordance with the invention is designed such that an afocal optical system is disposed directly in front of the eyeball to broaden the diameter of the bundle of parallel rays that pass through the pupil of the eye, and a reflecting mirror of an optical system for projecting the external object is placed at a certain point of the broadened light path, the broadened bundle of rays being received by a telescopic ophthalmoscope magnifier so that the image of the external object is objectively observable in overlapped relation with the retinal image. The fundamental principle consists in the possible closest arrangement of the respective optical systems for the lightray bundles incident on and reflected from, the eye fundus without incurring possible mutual interference: the light bundles incident upon, and reflected from, the eye fundus travel one and the same path. Accordingly, an afocal optical system is arranged in the light path directly in front of the eyeball to broaden the parallel bundles of rays in diameter and in the closest possible spatial relationship yet safe from incurring mutual interference, and susceptible of readily taking out the bundles of rays with sharp outlining. It is furthermore noted that, when the image of the external object is formed on the retina, the observing optical ssytem is to be exactly focussed on the retina, and that the visual angle is made as large as possible.

Other objects and advantages will readily and more fully be understood by the following description of an illustrative embodiment when read in conjunction with the accompanying drawing, in which:

FIG. 1 is a side view of the optical system used in an embodiment according to the invention; and FIG. 2 is a plan view of the optical system shown in FIG. 1.

The present inventive device comprises (a) the observing optical system for objectively observing the retina of the subject under examination and (b) the projecting optical system for projecting the image of an external object upon the retina. In the illustrative embodiment, both optical systems have the common use of negative lens component 1 which is arranged directly in front of the eye of the subject being observed. The projecting optical system comprises, as illustrated in FIGURE 1, said negative lens 1 arranged on the visual axis, reflecting mirror 2 disposed on visual axis with a 45° inclination thereto, and, successively disposed below mirror 2, positive component 3, pattern preparation 4 which carries external object image, positive component 5, heat-absorbing glass 6 and light source 7. The system projects the image of preparation 4 on the retina of eyeball E. With the illustrated form, pattern preparation 4 is assumed to be a test chart of Landolt's rings, or the reprinted film of an article, a picture of a person, etc., to be observed. This may be replaced by a cinefilm or a TV picture for projection to observe a moving image thereof on the retina.

On the other hand, the observing optical system comprises an objective optical system having said common negative component 1, a large positive component 8 arranged opposite, with respect to reflecting mirror 2, to negative component 1 and centered about the optical axis, a pair of transversely arranged small positive components 9a and 9b to the left side of component 8 in FIG. 1 (in FIG. 2, in the lower position), and a pair of eye pieces 12a and 12b through which the retinal image may be observed through a pair of oppositely arranged Porro prisms 11a and 11b. Thus negative component 1 is arranged so that it broadens the light bundle emergent through the limited area of pupil P from the fundus F, and the two side bundles of rays, reflecting mirror 2 being positioned therebetween, through the respective sides of common component 8, may strike upon a pair of small positive components 9a and 9b, respectively. It is desirable that the projecting optical system, 1 to 7, be designed susceptible of limited rotation around a perpendicular line V passing substantially the center of the pupil.

When light source 7 is illuminated, the image of the object represented in pattern preparation 4 is projected upon the retinal area of the eye including the fovea centralis of the subject being observed, the results of such projection may be observed by the observer through the observing optical system. If the pattern preparation is a test chart, such as above mentioned, and when the observer asks the subject to look at any specified figure in the chart, the bright point corresponding to the fovea centralis of the eye of the subject will be objectively observed by the observer as it moves to lie on the specified figure. According to this technique, it is possible, as referred to above, to determine the hitherto impossible peripheral visual acuity or affected visual acuity resulting from eye oscillation as pattern preparation 4 is moved. Thus, in this way, the present inventive device enables the objective determination of the specified one of fixation among the images of a plurality of external objects formed on the retina by pursuing the bright point, which corresponds to the fovea centralis of the retina, as this moves. The device may be used, beside diagnosis for ophthamological treatment, for determining various human psychological phenomena accompanying visual reactions as aforementioned.

It is noted, in addition, that in the illustrative embodiment shown above, a strongly effective negative lens component is positioned directly in front of the eyeball to broaden the light path in the foreground of the pupil, and in this broadened light path are arranged a pair of objectives of a binocular of the observing optical system and a reflector of the projecting optical system. However, these optical systems are not to be restricted in arrangement to the illustrative form, and, for example, in the observing optical system the binocular may be replaced by a wide-angle telescope, and the reflecting mirror by a half-silvered one that should lie transverse to the whole light path for the observing optical system. In any event, in the instant invention device, it is convenient that a light beam should be thrown through the limited area of pupil into the eyeball to be reflected from the retina thereof, and, in order to assure sufficient space for the reflected light beam to be separated into two beams, a relatively highly refractive concave or convex lens component of an afocal optical system be arranged directly in front of the eyeball to broaden the light path into which is directed the projecting light beam and from which is drawn the observation beam. It is further noted that impairing spots of light in observation produced by the projecting light beam reflected on the crystalline lens or other part of the eyeball is effectively removed by slightly rotating the projecting optical system around the perpendicular V axis referred to above.

What is claimed is:

1. A device for objectively observing the overlapped image of an external object and the retinal image, comprising,
    a reflecting mirror for introducing the image of the external object to the retina,
    a negative lens so placed just in front of the eyeball to be observed that the bundles of light rays therefrom bypass the mirror,
    a first positive lens forming an afocal system with the negative lens, the reflecting mirror being on the optical axis of the afocal system at an angle to said first positive lens intermediate the negative lens and intermediate the negative lens and the positive lens,
    a projection optical system including a light source,
    a pattern preparation for projection by the projection system on the mirror through said first positive lens and through the negative lens onto the retina of the eyeball, and
    a stereoscopic and telscopic opthalmoscope magnifier for observing the retina of the eye in cooperation with the afocal system.
    said magnifier including a second positive lens and a pair of objectives symmetrically spaced on the optical axis of said second lens in the vicinity of the peripheral portion thereof, and optically aligned with said negative and first positive lenses,
    said mirror being so disposed on the optical axis, that the divergent light rays bypassing the mirror enter the magnifier objectives.

2. A device so set forth in claim 1, wherein the pattern preparation is a transparent film.

References Cited

UNITED STATES PATENTS

| 1,116,529 | 11/1914 | Allen | 351—6 |
| 738,887 | 9/1903 | De Zeng | 351—6 |

FOREIGN PATENTS

| 20,572 | 9/1914 | Great Britain. |
| 323,162 | 7/1914 | Germany. |
| 555,063 | 11/1929 | Germany. |

DAVID SCHONBERG, *Primary Examiner.*

P. R. GILLIAM, *Assistant Examiner.*

U.S. Cl. X.R.

350—33, 35; 351—13, 16

UNITED STATES PATENT OFFICE
CERTIFICATE OF CORRECTION

Patent No. 3,424,518 January 28, 1969

Tikasi Sato et al.

It is certified that error appears in the above identified patent and that said Letters Patent are hereby corrected as shown below:

Column 4, line 30, cancel "intermediate the negative lens".

Signed and sealed this 27th day of October 1970.

(SEAL)
Attest:

Edward M. Fletcher, Jr.
Attesting Officer

WILLIAM E. SCHUYLER, JR.
Commissioner of Patents